Patented Nov. 21, 1933

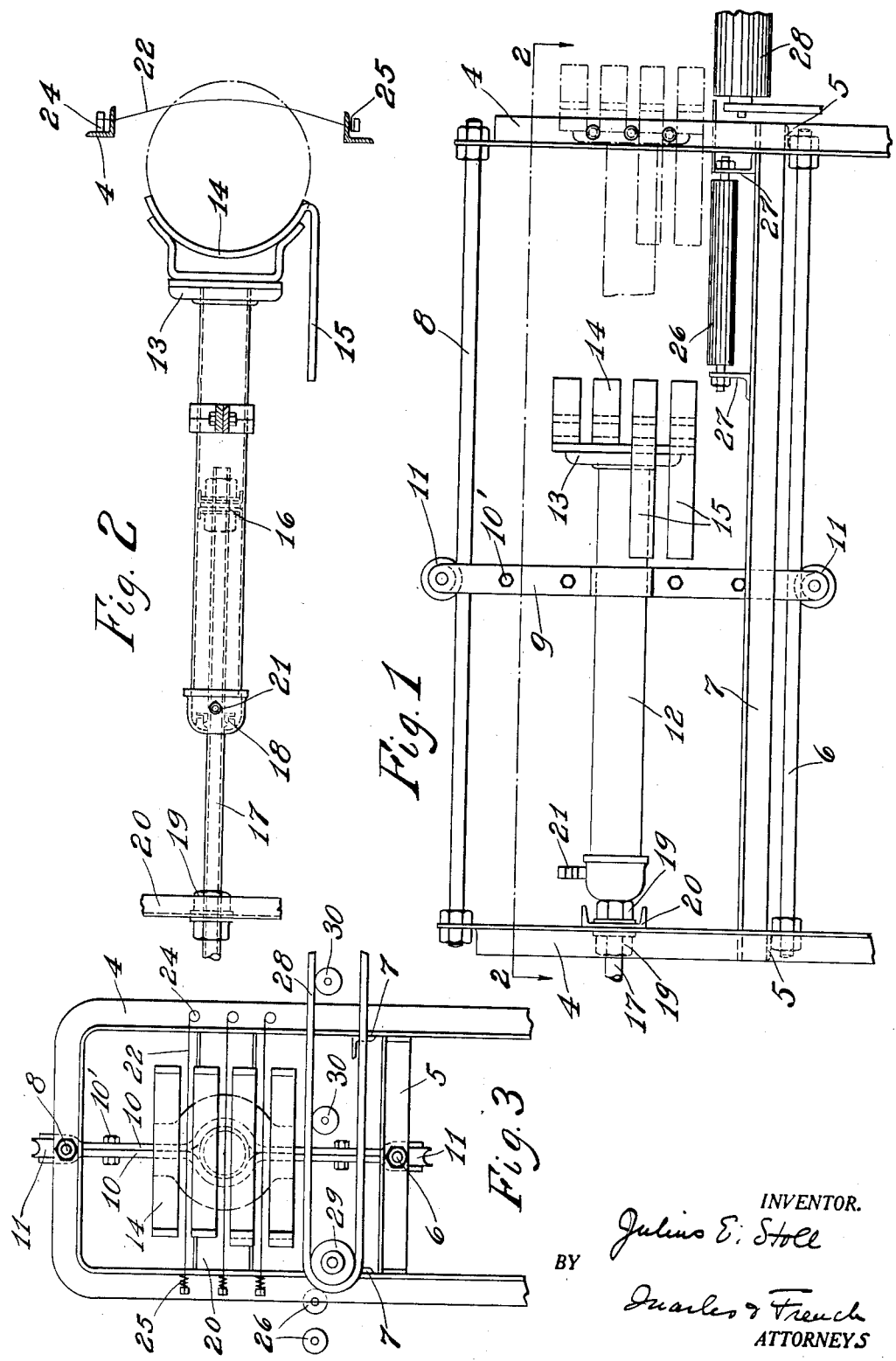

1,935,676

UNITED STATES PATENT OFFICE 1,935,676

CHEESE CUTTING APPARATUS

Julius E. Stoll, Milwaukee, Wis., assignor, by mesne assignments, to Premier-Pabst Corporation, a corporation of Delaware Application January 26, 1931. Serial No. 511,343

2 Claims. (Cl. 31—20)

The invention relates to cheese cutting apparatus.

The object of the invention is to provide a power operated apparatus for cutting up large cheeses expeditiously and thus save time and labor in the preparation of the cheeses for processing. More particularly also the present apparatus provides for receiving the cheese from a conveyor, cutting and feeding the cut cheese onto another conveyor so that the cutting process may form a step in the production line for preparing the raw product for processing and so that an otherwise laborious and time consuming operation when accomplished manually may be eliminated.

The invention further consists in the several features hereinafter set forth and more particularly defined by claims at the conclusion hereof.

In the drawing, Fig. 1 is a side elevation view of an apparatus embodying the invention, parts being broken away;

Fig. 2 is a detail sectional view taken on the line 2—2 of Fig. 1;

Fig. 3 is a front end elevation view.

In the drawing, the numeral 4 designates a pair of U-shaped frame members adapted to be secured at their bases in any suitable manner and each having a cross frame member 5 secured thereto and connected together by a centrally disposed tie rod, guide and rail member 6 and also by angled frame members 7. An upper tie rod, guide and rail member 8 is connected to the central portions of the transverse portion of the frame 4.

A carriage 9 is formed by bars 10 connected together by bolts 10′ or other suitable fastening means and carrying grooved wheels 11 running on the tracks or rails 6 and 8.

The carriage 9 is clamped to and carries a fluid pressure operated cylinder or ram 12 having a head 13 provided with spaced curved cheese engaging bars 14, the lower of which preferably have rearwardly extending extensions 15. The cylinder moves relatively to a relatively fixed suitably packed piston 16 which divides the space within the cylinder into two compartments, and the piston rod 17 of which is hollow and works through a suitable stuffing box 18 in the end of the cylinder, said rod being secured by bolts 19 to a cross brace 20 of the rear frame member 4.

The compressed air for the forward part of the cylinder is introduced through the rod 17 from any suitable source of supply and exhausted through said rod and compressed air for the rear part of the cylinder is introduced through a nipple 21 on the cylinder connected by suitable piping with the supply and also exhausted through this connection, these connections being controlled by suitable valve mechanism not shown but usualy being the well known three way valve.

Cutting wires 22 are stretched across the open end of the front frame 4 being anchored at one end to pins 24 secured thereto and being connected at their other ends to one end of springs 25 whose other ends in turn are connected to the other side of the frame, said wires being disposed in the spaces between the bars 14 of the head of the ram.

A roller feed conveyor comprising a plurality of rollers 26, mounted in angle irons 27 extending transversely of the frame, one of said rollers and their support being shown in full in Fig. 1 while several of the other rollers are indicated in Fig. 3, carries the cheese to be cut into position behind the wires 22 and in front of the ram while a delivery conveyor in the form of an endless belt 28 mounted on a large roller 29 and smaller supporting rollers 30 is adapted to receive the cut cheese sections as the cheese is forced past the wires 22 on the cutting operation.

With the construction above described, the cheeses are carried into the apparatus on the conveyor rollers 26, one at a time and when the ram is in the free line retracted position shown in Fig. 1. Thereafter the operator opens up the pipe 17 to the source of compressed air while releasing air through the connection 21 and the ram then moves forwardly, the curved head members 14 engaging the curved side of the cheese and forcing the same against and past the wires 22 which thus cut it into smaller circular sections and at the same time push the cheese onto the conveyor belt 28, the ram being shown in dotted lines in Fig. 1 at the termination of its outward stroke. During the cutting operation or in case of a slight overthrow of the ram, the springs 25 will permit the wires to yield bodily without danger of breaking them. Furthermore, as the ram moves on its feeding stroke, the extensions 15 move across the conveyor and prevent other cheeses that may be coming along on the conveyor interfering with the action of the ram on the cheese that is then in the apparatus. After the cutting operation, the ram is returned by releasing the air from the forward compartment or the space in front of the piston and introducing compressed air through the nipple 21 into the space in the ram behind the piston. During its reciprocating movement the ram is guided by the carriage 9 along the rails 6 and 8.

I desire it to be understood that this invention is not to be limited to any particular form or arrangement of parts except in so far as such limitations are included in the claims.

What I claim as my invention is:

1. In a cheese cutting apparatus, the combination of a frame provided with spaced cutting wires, a carriage mounted to move on said frame, a ram carried by said carriage and provided with a cheese engaging head for forcing the cheese past said wires, and fluid pressure operated means for reciprocating said ram.

2. In a cheese cutting apparatus, the combination of a frame provided with spaced cutting wires, a carriage mounted to move on said frame, supporting rollers for the cheese to position the same between the wires and said carriage and admit the cheese from one side of the frame, a power operated plunger mounted on the carriage and provided with a head having spaced cheese engaging members working in the spaces between the wires, and fluid pressure operated means for moving said plunger and carriage.

JULIUS E. STOLL.